May 20, 1958

H. VOLKERS ET AL 2,835,750

TRANSISTOR AMPLIFIER

Filed July 13, 1955

INVENTORS
HENDRIK VOLKER
GERARDUS ROSIER
BY Fred M. Vogel
AGENT 2,835,750

United States Patent Office 2,835,750
Patented May 20, 1958

2,835,750

TRANSISTOR AMPLIFIER

Hendrik Volkers and Gerardus Rosier, Hilversum, Netherlands, assignors, by mesne assignments, to North American Philips Company, Inc., New York, N. Y., a corporation of Delaware Application July 13, 1955, Serial No. 521,868

Claims priority, application Netherlands August 6, 1954

8 Claims. (Cl. 179—171)

The present invention relates to amplifier circuit arrangements. More particularly, the invention relates to transistor amplifier circuit arrangements comprising a first transistor, the collector circuit of which is coupled through a matching transformer to the emitter circuit of a second transistor.

It is found that, in transistors in general, the collector direct current varies comparatively considerably with the temperature. In order to suppress the undesired variation it is known to insert a resistor in the emitter circuit, which resistor may or may not be bypassed with respect to the signal frequencies.

On the other hand, attempts are made to reduce the transformer in size, and when this done the direct currents passing through the transformer windings might bring about undue premagnetization of the transformer core.

The present invention provides circuit-arrangements in which both limitations are met by simple means. In accordance with the invention, in order to avoid direct current premagnetization of the transformer and for simultaneous stabilization of the working point of the second transistor the transformer utilized has two secondary windings. The two secondary windings in series with a stabilizing resistor, are traversed by the emitter direct current of the second transistor. Only the alternating voltage across one of the secondary windings, preferably that with the smaller number of turns, is made operative via a coupling capacitor between the emitter and the base electrode of the second transistor.

In order that the invention may be readily carried into effect, it will now be described with reference to the accompanying drawing, given by way of example, in which.

Figures 1, 2, 3, 4, 5:
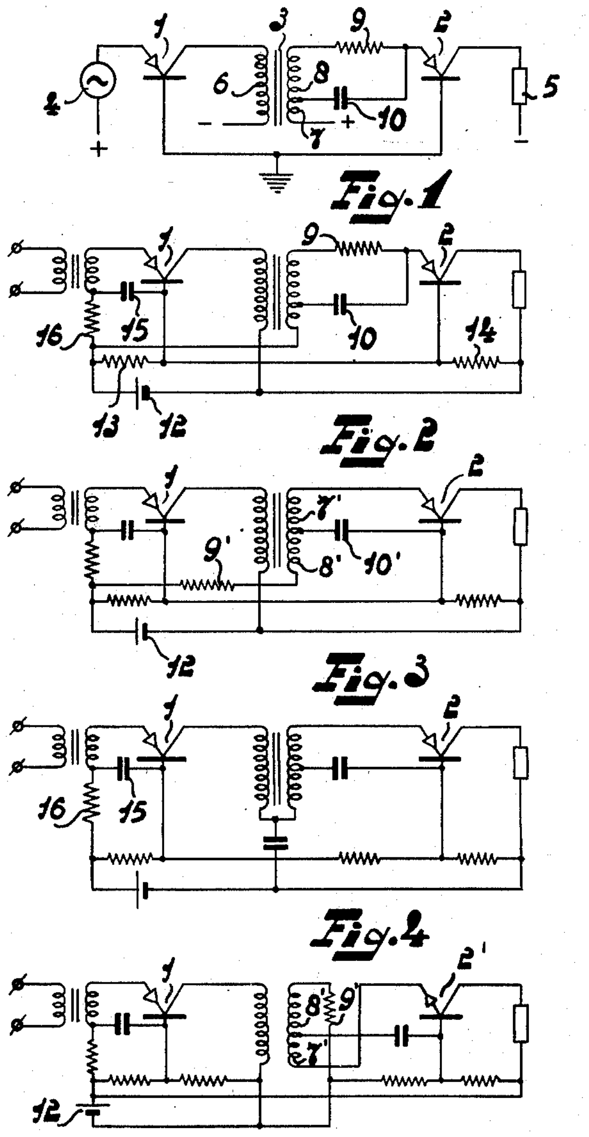
Fig. 1 is a schematic diagram of an embodiment of the circuit arrangement of the present invention.
Fig. 2 is a schematic diagram of the embodiment of Fig. 1, in more detail.
Fig. 3 is a modification of the circuit arrangement of Fig. 2.
Fig. 4 is a modification of the circuit arrangement of Fig. 3.
Fig. 5 is another modification of the circuit arrangement of Fig. 3.

The amplifier circuit arrangement shown in Fig. 1 comprises a first transistor 1 and a second transistor 2, both preferably of the junction type. The collector circuit of transistor 1 is matched to the emitter circuit of transistor 2 by means of a matching transformer 3, so that signals from a source 4, produce amplified signals across a load 5.

In accordance with the invention the transformer 3 comprises a primary winding 6 and two secondary windings 7 and 8. The emitter-direct current of the transistor 2 passes from the plus terminal of the source of voltage supply through the series-circuit of the windings 7 and 8 and a stabilization resistor 9, which consequently stabilizes the transistor 2. By means of a coupling capacitor 10, only the alternating voltage across the winding 7 between the emitter and the base electrode of the transistor 2 is made operative.

In this manner, the windings 6 and 7 and 8, respectively, which are traversed in opposite sense, for example, by approximately equal direct currents, do not practically bring about direct current premagnetization of the transformer 3 with a proper choice of the number of turns of said transformer, and the transistor 1 is correctly matched to the transistor 2. Moreover, the use of thinner wire having a high natural resistance for the winding 8 permits a saving in space and the resistor 9 may even be dispensed with.

In the arrangement shown in Fig. 2, both transistors 1 and 2 are fed from a single source of voltage supply 12 and the base bias is produced for both transistors in common by means of a voltage divider 13, 14. The transistor 1 is stabilized by means of a resistor 16, bypassed by a capacitor 15; in the transistor 2 this is effected, similarly to Fig. 1, by means of the resistor 9 and the capacitor 10. If desired, one or more of the resistors may have the required temperature dependency for further stabilization.

In Fig. 3, which is a modification of Fig. 2, the resistor 9′ is substituted for the resistor 9 between the secondary winding 8′ and the source of voltage supply 12. In this case the capacitor 10′ is connected to the base electrode of the transistor 2, thus avoiding the slight signal negative feedback caused primarily by the resistor 13 in Fig. 2, which would otherwise necessitate an additional bypass capacitor for the base electrode of transistor 2.

In Fig. 4, which is a modification of Fig. 3, the transistors 1 and 2 are connected in series for the supply direct current in a known manner, the resistor 9 being constituted by the internal collector resistance of the transistor 1 which is stabilized in itself by the resistor 16 and bypass capacitor 15.

Fig. 5 is another modification of Fig. 3 and comprises two transistors 1 and 2′ of opposite conductivity type. The resistor 9′ is connected to the other, or negative, terminal of the source of voltage supply 12 and the secondary windings 7′ and 8′ are interchanged in order to secure the required reduction of direct current premagnetization.

In the circuit-arrangements shown in the drawing, the secondary windings 7, 8 and 7′, 8′, respectively, are embodied in a single tapped winding. It will be appreciated however, that the windings 8, 8′ and the resistances 9, 9′, respectively, may be interchanged in the emitter series-circuit, thereby rendering the transformer 3 a little more complicated. Naturally, the cascade shown in the drawing may alternatively be followed by a similarly stabilized transformer-coupled third transistor. As an alternative, the cascade may be further extended.

What is claimed is:

1. A circuit arrangement comprising a transistor having emitter and base electrodes defining an input electrode system and a collector electrode defining with said base electrode an output electrode system, a transformer having a magnetic core and an input winding section and a pair of output winding sections in magnetic relation to said core, means for supplying a current to said input winding section thereby normally producing a flux in a given direction in said core, a stabilizing resistor element, means for connecting said resistor element and one of said output winding sections in series circuit arrangement to the emitter electrode of said transistor whereby emitter direct current flows through said series circuit arrangement, said one output winding section being poled with respect to said last-mentioned current flow so as to substantially prevent direct current premegnetization of said core by said flux, means for applying a signal current to said input electrode system comprising a coupling capacitor interconnecting the other of said output winding sections and one of the electrodes of said input electrode system, and means for deriving an output signal from said output electrode system.

2. A circuit arrangement comprising first and second transistors each having emitter and base electrodes defining an input electrode system and a collector electrode defining with said base electrode an output electrode system, a transformer having a magnetic core and an input winding section and a pair of output winding sections in magnetic relation to said core, means for connecting said input winding section in said output electrode system of said first transistor, means for applying a signal current to said input electrode system of said first transistor thereby normally producing a flux in a given direction in said core, a stabilizing resistor element, means for connecting said resistor element and one of said output winding sections in series circuit arrangement to the emitter electrode of said second transistor whereby emitter direct current of said second transistor flows through said series circuit arrangement, said one output winding section being poled with respect to said last-mentioned current flow so as to substantially prevent direct current premagnetization of said core by said flux, a coupling capacitor interconnecting the other of said output winding sections and one of the electrodes of said input electrode system of said second transistor, and means for deriving an output signal from said output electrode system of said second transistor.

3. A circuit arrangement as claimed in claim 2, wherein the other of said output winding sections has a natural resistance and said stabilizing resistor element comprises at least a part of said natural resistance.

4. A circuit arrangement comprising first and second transistors each having emitter and base electrodes defining an input electrode system and a collector electrode defining with said base electrode an output electrode system, a transformer having a magnetic core and an input winding and an output winding in magnetic relation to said core, said output winding having two end terminals and a tapping point positioned thereon intermediate said end terminals to provide two winding sections, means for connecting said input winding in said output electrode system of said first transistor, means for applying a signal current to said input electrode system of said first transistor thereby normally producing a flux in a given direction in said core, a stabilizing resistor element, means for connecting said resistor element and one of said output winding sections through one of said end terminals in series circuit arrangement to the emitter electrode of said second transistor whereby emitter direct current of said second transistor flows through said series circuit arrangement, said one of said output winding sections being poled with respect to said last-mentioned current flow so as to substantially prevent direct current premagnetization of said core by said flux, a coupling capacitor interconnecting the other of said output winding sections and one of the electrodes of said input electrode system of said second transistor through said tapping point, and means for deriving an output signal from said output electrode system of said second transistor.

5. A circuit arrangement as claimed in claim 4, wherein the said other ouput winding section has a natural resistance and said stabilizing resistor element comprises at least a part of said natural resistance.

6. A circuit arrangement comprising first and second transistors each having emitter and base electrodes defining an input electrode system and a collector electrode defining with said base electrode an output electrode system, a transformer having a magnetic core and an input winding and an output winding in magnetic relation to said core, said output winding having two end terminals and a tapping point positioned thereon intermediate said end terminals to provide two winding sections, means for connecting said input winding in said output electrode system of said first transistor, means for supplying a signal current to said input electrode system of said first transistor thereby normally producing a flux in a given direction in said core, a stabilizing resistor element, means for connecting said resistor element and one of said output winding sections through one of said end terminals in series circuit arrangement to said emitter electrode of said second transistor whereby emitter direct current of said second transistor flows through said series circuit arrangement, said one of said output winding sections being poled with respect to said last-mentioned current flow so as to substantially prevent direct current premagnetization of said core by said flux, a coupling capacitor connected between said tapping point and said emitter electrode of said second transistor, and means for deriving an output signal from said output electrode system of said second transistor.

7. A circuit arrangement comprising first and second transistors each having emitter and base electrodes defining an input electrode system and a collector electrode defining with said base electrode an output electrode system, means for applying a biasing potential to said transistors comprising a source of voltage supply, a transformer having a magnetic core and an input winding and an output winding in magnetic relation to said core, said output winding having two end terminals and a tapping point positioned thereon intermediate said end terminals to provide two winding sections, means for connecting said input winding in said output electrode system of said first transistor, means for applying a signal current to said input electrode system of said first transistor thereby normally producing a flux in a given direction in said core, a stabilizing resistor element, means for connecting said resistor element in series circuit arrangement with one of said output winding sections between one of said end terminals and said source of voltage supply, means for connecting said other of said end terminals to said emitter electrode of said second transistor whereby emitter direct current from said second transistor flows through said series circuit arrangement, said one of said output winding sections being poled with respect to said last-mentioned current flow so as to substantially prevent direct current premagnetization of said core by said flux, a coupling capacitor connected between said tapping point and said base electrode of said second transistor, and means for deriving an output signal from said output electrode system of said second transistor.

8. A circuit arrangement as claimed in claim 6, further comprising means for stabilizing the working point of said first transistor, said first transistor having an internal collector resistance, wherein said stabilizing resistor element comprises said internal collector resistance.

References Cited in the file of this patent

UNITED STATES PATENTS

| | | |
|---|---|---|
| 1,809,879 | Whittle | June 16, 1931 |
| 2,033,278 | Fay | Mar. 10, 1936 |
| 2,730,576 | Caruthers | Jan. 10, 1956 |

OTHER REFERENCES

Terman: "Radio Engineering," McGraw-Hill, 1947, third edition, p. 248.

Shea: "Principles of Transistor Circuits," John Wiley & Sons Inc. Copywright September 15, 1953, p. 124.